United States Patent
Alfano et al.

(10) Patent No.: US 9,467,338 B2
(45) Date of Patent: Oct. 11, 2016

(54) METHOD FOR COMMUNICATING DEVICE MANAGEMENT DATA CHANGES

(75) Inventors: Nicholas Patrick Alfano, Stratford-Upon-Avon (GB); Thomas Owen Parry, Cambridge (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/053,901

(22) Filed: Mar. 22, 2011

(65) Prior Publication Data

US 2011/0246428 A1    Oct. 6, 2011

Related U.S. Application Data

(60) Provisional application No. 61/319,954, filed on Apr. 1, 2010.

(51) Int. Cl.
| | | |
|---|---|---|
| G06F 7/00 | (2006.01) |
| G06F 17/00 | (2006.01) |
| H04L 12/24 | (2006.01) |
| H04W 4/00 | (2009.01) |

(52) U.S. Cl.
CPC ....... *H04L 41/0856* (2013.01); *H04L 41/0206* (2013.01); *H04L 41/0213* (2013.01); *H04L 41/0233* (2013.01); *H04W 4/001* (2013.01)

(58) Field of Classification Search
None
See application file for complete search history.

(56) References Cited

U.S. PATENT DOCUMENTS

| | | | |
|---|---|---|---|
| 7,257,690 B1 | 8/2007 | Baird | |
| 9,002,787 B2* | 4/2015 | Ferrazzini | H04L 41/0213 707/625 |
| 2004/0123241 A1* | 6/2004 | Kaappa et al. | 715/513 |
| 2004/0261072 A1 | 12/2004 | Herle | |
| 2005/0234967 A1* | 10/2005 | Draluk et al. | 707/102 |
| 2006/0026228 A1* | 2/2006 | Kim | 709/202 |
| 2006/0174242 A1* | 8/2006 | Zhu et al. | 717/172 |
| 2007/0156794 A1 | 7/2007 | Kisley et al. | |
| 2007/0158404 A1* | 7/2007 | Li et al. | 235/375 |
| 2007/0180089 A1* | 8/2007 | Fok et al. | 709/223 |
| 2007/0198979 A1* | 8/2007 | Dice et al. | 718/100 |

(Continued)

FOREIGN PATENT DOCUMENTS

| | | |
|---|---|---|
| EP | 1750469 A1 | 2/2007 |
| WO | 2007113836 A2 | 10/2007 |

(Continued)

OTHER PUBLICATIONS

Ferrazzini, Axel, et al.: U.S. Appl. No. 12/363,177, filed Jan. 30, 2009; Title: Method and Apparatus for Tracking Device Management Data Changes.
Office Action dated Dec. 27, 2010; U.S. Appl. No. 12/363,177; 13 pages.
Extended European Search Report; European Application No. 09152094.0; May 18, 2009; 5 pages.

(Continued)

*Primary Examiner* — Tuan A Pham
(74) *Attorney, Agent, or Firm* — Moffat & Co.

(57) ABSTRACT

Methods and apparatuses relating to Open Mobile Alliance (OMA) device management (DM) are provided. An embodiment provides a method in which a mobile device is configured for: accumulating delta records on the mobile device; and pushing delta records to a DM server when a threshold for the delta records is met or exceeded. The delta records relate to changes made to an Open Mobile Alliance (OMA) device management (DM) tree. The delta records may be purged after the pushing operation. Other embodiments provide a mobile device and computer-readable medium for performing or facilitating the method.

18 Claims, 2 Drawing Sheets

(56) References Cited

U.S. PATENT DOCUMENTS

| | | | |
|---|---|---|---|
| 2007/0207800 A1* | 9/2007 | Daley | H04L 12/2602 |
| | | | 455/425 |
| 2007/0259633 A1* | 11/2007 | Rao | 455/130 |
| 2008/0114570 A1* | 5/2008 | Li et al. | 702/186 |
| 2008/0229142 A1 | 9/2008 | Anand et al. | |
| 2008/0288630 A1* | 11/2008 | Merat et al. | 709/224 |
| 2008/0306977 A1* | 12/2008 | Karuppiah | G06F 11/2038 |
| 2009/0036111 A1* | 2/2009 | Danford et al. | 455/419 |
| 2009/0044185 A1* | 2/2009 | Krivopaltsev | H04L 29/06 |
| | | | 717/173 |
| 2009/0228509 A1 | 9/2009 | McCarthy et al. | |
| 2009/0228606 A1 | 9/2009 | McCarthy et al. | |
| 2009/0307284 A1* | 12/2009 | Welingkar et al. | 707/204 |
| 2009/0313383 A1* | 12/2009 | Leung | H04L 12/1859 |
| | | | 709/235 |
| 2010/0185679 A1 | 7/2010 | Ferrazzini et al. | |
| 2011/0010383 A1* | 1/2011 | Thompson et al. | 707/769 |
| 2011/0047253 A1* | 2/2011 | Bhat | 709/221 |

FOREIGN PATENT DOCUMENTS

| | | |
|---|---|---|
| WO | 2008022195 A1 | 2/2008 |
| WO | 2008050042 A2 | 5/2008 |
| WO | 2010/085875 | 8/2010 |

OTHER PUBLICATIONS

Examination Report; European Application No. 09152094.0; Jan. 26, 2011; 4 pages.
PCT International Search Report; PCT Application No. PCT/CA2010/000085; Mar. 11, 2010; 3 pages.
PCT Written Opinion of the International Searching Authority; PCT Application No. PCT/CA2010/000085; Mar. 11, 2010; 6 pages.
PCT Written Opinion of the International Preliminary Examining Authority; PCT Application No. PCT/CA2010/000085; Jan. 25, 2011; 6 pages.
Open Mobile Alliance, Ltd., SyncML Device Management Tree and Description, Version 1.1.2, Dec. 12, 2003, 44 pages.
Open Mobile Alliance, Ltd., Device Management, Version 2.0, Oct. 6, 2008, 4 pages.
Canadian Intellectual Property Office, Office Action, Application No. 2793711, Sep. 15, 2014.
Oracle, Oracle Database Backup and Recovery Basics, 10g Release 2 (10.2), B14192-03, Nov. 2005.
PCT International Search Report, PCT Application No. PCT/CA2011/000304, Jun. 3, 2011.
PCT Written Opinion of the International Searching Authority, PCT Application No. PCT/CA2011/000304, Jun. 22 2013.
Supplementary European Search Report on European Application No. 11761854.6, dated Jul. 23, 2014.
Canadian Intellectual Property Office, Office Action on Application No. 2,793,711, Issued on Sep. 16, 2015.

* cited by examiner

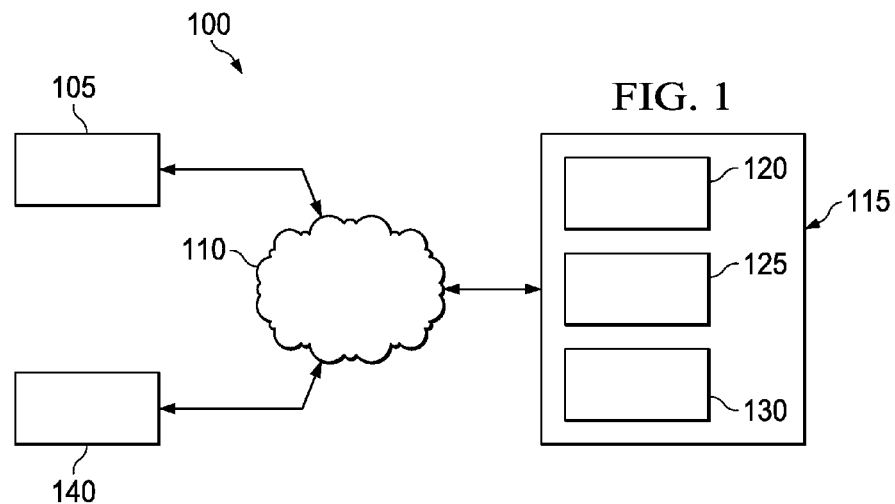
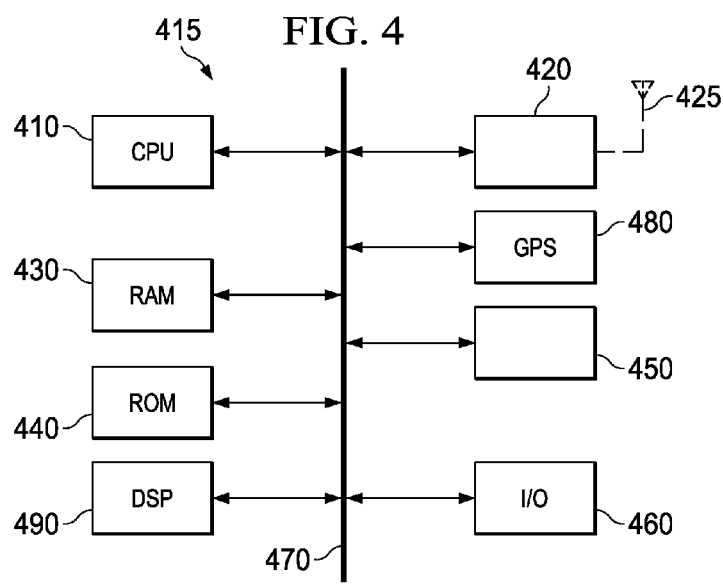

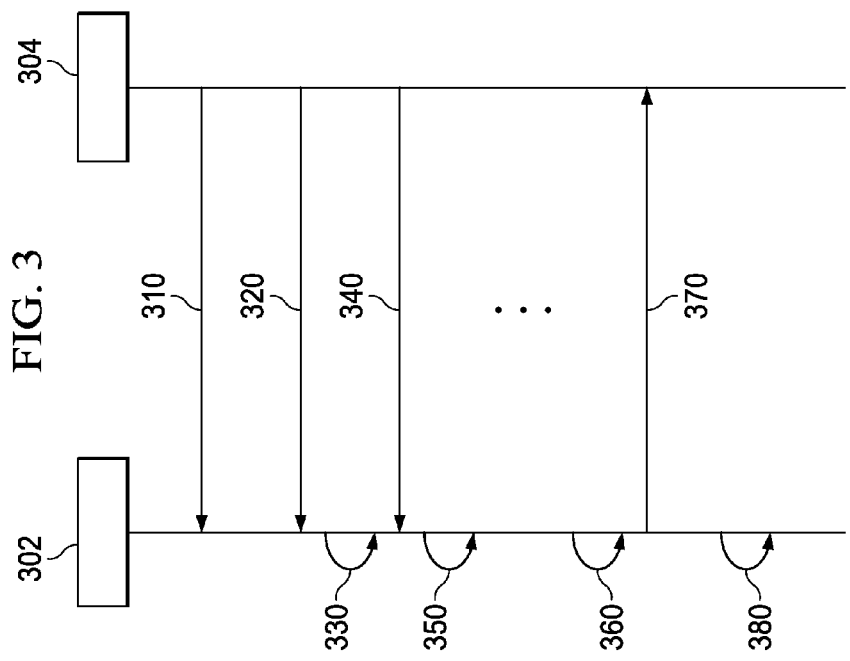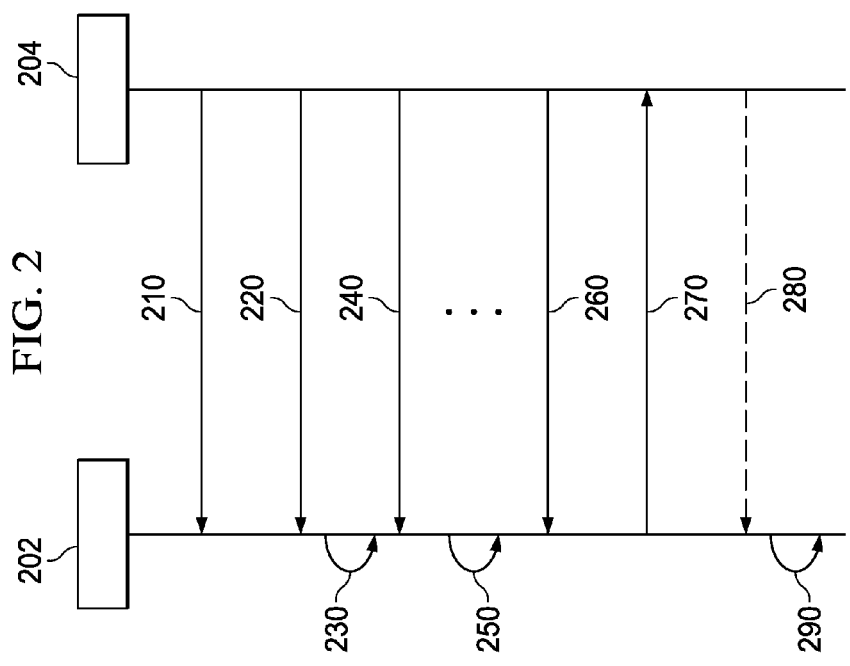

METHOD FOR COMMUNICATING DEVICE MANAGEMENT DATA CHANGES

CROSS-REFERENCE TO RELATED APPLICATIONS

This application claims priority to U.S. Provisional Patent Application No. 61/319,954 filed Apr. 1, 2010, the content of which is hereby incorporated by reference.

BACKGROUND

As used herein, the terms "user equipment" and "UE" might in some cases refer to mobile devices such as mobile telephones, smartphone, personal digital assistants, handheld or laptop computers, and similar devices that have telecommunications capabilities. However, in other cases the term "UE" might refer to communication terminals or devices that have similar communication capabilities as those previously-mentioned devices but that are not considered to be readily transportable, such as desktop computers, set-top boxes, or network appliances. The "UE" can execute or otherwise include one or more software components that can manage or otherwise facilitate a communication session for a user of the UE. These software components may be referred to using the terms "user agent," "UA" and the like.

The Open Mobile Alliance (OMA) Device Management (DM) specification supports extensions called Management Objects (MOs), which are logical collections of related pieces of data stored in a data structure known as a DM tree. A UE that supports OMA DM typically has an embedded OMA DM client which communicates with an OMA DM server in the network. The OMA DM client acts as an intermediary between MOs and the applications, functions, agents, or other software or firmware components on the UE that might make use of the MOs to configure their services. An entity that interacts with the OMA DM client on the UE and an OMA DM server includes a Management Authority (MA) which may be a user, a network operator, a handset manufacturer, an enterprise administrator, an agent, or an application that may create, modify, or delete an MO, and may make requests to the UE.

Each MO on a UE typically contains data related to a specific application or capability (e.g., software or hardware) of the UE. For example, an email MO might contain data associated with an email agent. If multiple email agents are installed on a UE, each might use a separate email MO, or they might all use the same email MO. All of the MOs and agents on a UE typically interact via a single DM client. The device management (DM) tree organizes the MOs in a logical hierarchical manner. Each of these MOs might include multiple nodes that include a single integer value, an indicator, a flag, a universal resource identifier (URI), or might include, for example, a picture and/or other information.

The OMA DM standard provides for the previously-mentioned DM tree of Managed Objects (MO) to be stored on a user equipment (UE). The MOs may be used to manage at least one of functionalities, capabilities and behaviors of UEs in a variety of ways such as, for example provisioning, configuring, upgrading software and fault tracking. As used herein, the term provisioning may include enabling and disabling of features on the UE. As used herein, the term configuring may include modifying settings and parameters of the UE. As used herein, the term software upgrades may include installation of new software or bug fixes for pre-installed software to include application software and system software. As used herein, the term fault tracking may include reporting errors or status of the UE. The UE may use all or a subset of the MOs described herein.

The DM tree on the UE may be accessed and managed by a DM client on the UE. The DM client on the UE may interact with a network component configured as or with a DM server. The DM server may issue commands to the DM client on the UE which may in turn apply changes to the DM tree of MOs on the UE. Several DM servers may be issuing commands to the DM client on the UE to modify the same DM tree. For example, a first DM server may provide configuration information for email services and a second DM server may provide information regarding an internet service. Both the first and the second server may need to know the status of the current DM tree on the UE prior to making updates in order to prevent conflicts or the inefficiency of installing the same update twice.

Before a DM server acts on a DM tree on a UE, the DM server may communicate with the DM client to be synchronized with the current state of the DM tree on the UE. For example, the DM server may issue a request or command to read or retrieve the entire DM tree and return the state of all the MOs on a UE to facilitate synchronization of the UE status with the DM server status. Requiring the entire DM tree and all of the data in the MOs to be transmitted from the UE to the DM server is a resource intensive process. Accordingly, one specified functionality of OMA DM is to support a mechanism allowing a server to retrieve the value of a DM client's MOs (all or subset) with a focus on the query and response consuming minimum bandwidth and processing resources. The objectives of this mechanism are that: 1) the UE responds quickly (minimum processing required to respond to a query); and 2) data transmitted is small (minimum bandwidth required to transmit a response).

To this end it has been proposed to document changes to the DM tree by storing "delta records," which are created in the UE to indicate incremental changes or "diffs." In this way the DM server need not determine DM tree changes by comparing or reconciling a newly-received DM tree status from the DM client with a previously-received DM tree status. The delta records may be used to identify who, what and when changes were applied or made. The delta records may be stored in the UE, for example in a memory or separate data structure, such as a file or log. As used herein, the term change log may be used to refer to the data structure where the changes made to the DM tree on the UE are stored. A change log may include information such as: the MO that was changed; the new value of the MO; the date and time the change was made; the entity that requested the change; and any other useful information. The change log may be a file, database, spreadsheet, a table within a database or any other medium or arrangement for storing data.

In view of using delta records in OMA DM for efficient retrieval of DM tree changes by the DM client, and for efficient communication of DM tree changes to the DM server, the present disclosure details additional behavior or functionality vis-à-vis delta records.

BRIEF DESCRIPTION OF THE DRAWINGS

FIG. 1 is a diagram illustrating an example system suitable for implementing an embodiment of the present disclosure.

FIG. 2 illustrates an example flow diagram showing a method of managing (e.g., creating, storing, pushing and purging) DM delta records.

FIG. 3 illustrates an example flow diagram showing another method of managing (e.g., creating, storing, pushing and purging) DM delta records.

FIG. 4 is a diagram illustrating an example apparatus suitable for implementing aspects of the present disclosure.

DETAILED DESCRIPTION

Turning now to the Figures, FIG. 1 is a diagram illustrating an example system 100 suitable for implementing one or more embodiments disclosed herein. The system 100 includes DM servers 105 and 140, a user equipment (UE) 115 that includes a DM client 125, and a network 110 to promote connection therebetween. The communications between the UE 115 and the DM servers 105 and 140 via the network 110 may be via a wired or a wireless link or connection.

The DM servers 105 and 140 may be a system, subsystem or components of a network operator or service provider or other network component configured as DM server. The DM servers 105 and 140 may forward a communication, command or request message, via the network 110, to create, modify or delete a MO at the UE 115. The DM servers 105 and 140 may also promote storing DM data related to the MOs on the UE 115. DM data may be stored in a DM tree 120 on the UE 115, on at least one of the DM servers 105 and 140, or on both of the UE 115 and at least one of DM servers 105, 140.

The network 110 may use a Third Generation Partnership Project (3GPP) technology, an LTE technology, or some other technology. Internet protocols (IP) IPV4, IPV6, GPRS Tunneling Protocol (GTP), HTTP, SIP and/or other current or future protocols may be supported by these technologies. In addition, the network 110 may be serviced by any or a combination of Internet Protocol-based networks, packet-based networks, public-switched telecom networks, ad-hoc mesh-type networks and/or integrated services digital networks. The network 110 may be wired, wireless or both and may implement any network technology known in the art.

The UE 115 is operable for implementing aspects of the disclosure, but the disclosure should not be limited to these implementations. The UE 115 may take various forms including a mobile phone, a smartphone, a wireless handset, a pager, a personal digital assistant (PDA), a portable computer, a tablet computer, or a laptop computer. Many suitable devices combine some or all of these functions. In some embodiments of the disclosure, the UE 115 is not a general purpose computing device like a portable, laptop or tablet computer, but rather is a special-purpose communications device such as a mobile phone, wireless handset, pager, or PDA. In another embodiment, the UE 115 may be a portable, laptop or other computing device.

A UE 115 may be configured with or include a set of MOs, for example, pre-configured by the manufacturer of the UE 115. The MOs may be configured in the DM tree 120. The UE 115 may also include a DM client 125 for managing the MOs. The DM server 105 or 140 (or both) may issue a command or request to the DM client 125 via the network 110. The command may be to create, modify or delete an MO on the UE 115. The DM client 125 executes the change to the MO and/or the DM tree 120 and writes a record of the change to the change log 130.

For various reasons, other servers, such as a second DM server 140, may need to update the DM tree 120 of the UE 115. For example, a first DM server 105 may handle a first type of service and a second DM server 140 may handle a second type of service. Also, two DM servers may provide the same service, for example, to allow for data traffic balancing during peak data traffic periods. The second DM server 140 may require synchronization of the status of the DM tree 120 on the UE 115. The second DM server may send a status request via the network 110 to the UE 115. The DM client 125 on the UE 115 may receive the request and retrieve the change log 130. Based on the retrieve request/command or status request communicated by the DM server, the DM client 125 may send the change log 130 or a portion of the change log 130 (e.g., based on one or more parameters of the retrieve request/command) to one or both of the first and second DM servers 105, 140. The second DM server 140 may synchronize the DM tree status stored on the second DM server 140 with the change log 120 or partial change log received from the DM client 125.

Delta records or change entries (e.g., a subset of entries or each entry) in the change log 120 may be assigned a unique identifier to, for example, aid in retrieval, synchronization and the like. In one instance, the unique identifier may be related to when a change was made. For example, the unique identifier may be a time and/or date stamp or the like. In another instance, the unique identifier may be one or more alphanumeric characters for example an index value that is sequentially incremented in nature, such as a one-up integer. For example, a first change may be assigned a unique identifier of 150. Each subsequent change may be assigned the next sequential integer. For example, the second change may be assigned unique identifier 151, and the third change may be assigned unique identifier 152 and so on. In this case, the DM server may transmit a status inquiry for changes based upon the unique identifier of the change. In response to the request from the DM server, the DM client may provide only the requested entries from the change log, thereby saving transmission resources.

FIG. 2 illustrates an example flow diagram showing behaviors of the DM server and the DM client with respect to delta records. As shown, the DM client 202 receives communications, messages or commands sent by the DM server 204. DM client 202 may be different from, the same as or substantially similar to DM client 125 of FIG. 1. Also, DM server 204 may be the same as or substantially similar to one or both of DM servers 105, 140 shown in FIG. 1. Communication or message 210, which is sent by DM server 204 to DM client 202, may include information or a command that tells the DM client to start or otherwise enable delta record functionality—that is generation, recording/storage, management, etc. of delta records on the DM client 202. Communication 210 may be in the format of a Package 2 which is specified by the OMA DM protocol for carrying initial management operations or commands. After enabling delta record functionality, the DM server 204 may send communication 220 to the DM client 202 for modifying an element (i.e. an MO) of the DM tree. Communication 220 may specify that an element of the DM tree be created, modified or deleted. Communication 220 may be in the format of a Package 4 which is specified by the OMA DM protocol for carrying subsequent management operations or commands.

Responsive to communication 220, the DM client 202 processes the communication in operation 230 to modify the DM tree accordingly and generate a delta record indicating the change that was made to the DM tree. Based on a communication 220 specifying to add a node to the DM tree, the following delta record may be created and/or stored:

<Delta> <time><seq><authID> <add> <MO URI node> </Delta> where the <MO URI node> element indicates the node added.

Furthermore, responsive to a communication 220 specifying to change a node value of the DM tree, the following delta record may be created and/or stored:

<Delta> <time><seq><authID> <change> <MO URI node> <new value> </Delta>

Additionally, responsive to a communication 220 specifying to delete a node of the DM tree, the following delta record may be created and/or stored:

<Delta> <time><seq><authID> <delete> <MO URI node> </Delta> where the <MO URI node> would include the full path and node that was deleted.

Although FIG. 2 shows the communication 220 being sent and received subsequent to the communication 210, which enables delta record functionality at the DM client 202, the communication 220 may also be sent and received before delta record-enabling communication 210. When communication 220 occurs before communication 210 no delta record would be created or stored relative to communication 220.

Operation 230 performed by the DM client 202 may include one or more operations of: modifying the DM tree according to a received communication (e.g. communication 220); creating a delta record that indicates a change made to the DM tree; and storing the delta record in the UE. As is indicated by communication 240 and operation 250, additional delta records may be created and/or stored by the DM client 202 after operation 230. That is, the DM server 204 may send communication 240 to the DM client 202 for modifying an element (i.e. an MO) of the DM tree. Communication 240 may instruct or command the DM client 202 to modify an element of the DM tree that was previously modified (relative to communication 220 for example) or another element of the DM tree. Communication 240 may be substantially similar to communication 220 in that communication 240 specifies that an element of the DM tree is to be created, modified or deleted. Communication 240 may also be in the format of a Package 4 which is specified by the OMA DM protocol for carrying subsequent management operations or commands. Responsive to communication 240, the DM client 202 processes the communication in operation 250 (which may be similar to operation 230) to modify the DM tree accordingly and generate a delta record indicating the change that was made to the DM tree.

As a result of operations 230 and 250, the DM client 202 may apply logic to create an aggregate or consolidated delta record or entry to the change log that represents the current state of the MO. For example if the same MO entry were modified several times on the DM tree, the DM client may create an entry to the change log that captures only the current state of the MO. However, the DM client may be configured to create and store distinct delta records for each requested/commanded change instead of aggregating or consolidating information for one MO in a single delta record.

FIG. 2 shows that, after generation of one or more delta records, the DM server 204 may send a communication or message 260 to the DM client 202 for retrieving one or more of the delta records. That is, communication 260 instructs or commands the DM client 202 to retrieve one or more requested delta records and send those one or more retrieved delta records to the DM server 204. Communication 260 may also be in the format of a Package 4 which is specified by the OMA DM protocol.

The retrieve command of communication 260 would be used by the DM server to retrieve delta records from the UE via the DM client. One examples retrieve command/request is:

<Retrieve> <all> </Retrieve> which, depending on the particular DM server issuing the retrieve command/request, may return all delta records or a subset of delta records.

In one instance, if the DM server issuing the retrieve command/request is "privileged," the retrieve all command/request causes the DM client to communicate all delta records to the requesting DM server. In another instance, a subset of the delta records is retrieved and communicated depending on an access control list (ACL) of the changed/affected nodes in the DM tree. That is, delta records may be filtered such that if an entity (e.g., DM server or authority) issuing the retrieve command/request can read a particular node of the DM tree, then that same entity should be able to see a filtered view of the delta records that correspond to or are associated with all readable nodes by that entity. In yet another instance, the DM client communicates only the delta records that were created based on previously-issued commands from a particular (non-privileged) DM server issuing the retrieve command.

Another example retrieve command/request is:

<Retrieve> <seq #> </Retrieve> which causes the DM client to retrieve and communicate records with sequence number greater than or equal to the indicated/specified Seq #.

Yet another example retrieve command/request is:

<Retrieve> <timestamp> </Retrieve> which causes the DM client to retrieve and communicate records with timestamp greater than or equal to timestamp indicated/specified in command.

The "retrieve seq #" and "retrieve timestamp" commands/requests may cause the DM client on the UE to act in a somewhat similar fashion as with the "retrieve all" command/request. That is, in one instance, if the DM server issuing the retrieve command/request is "privileged," these "retrieve seq #" and "retrieve timestamp" commands/requests cause the DM client to communicate all delta records relative to the specified seq # or timestamp respectively to the requesting DM server. In another instance, a subset of the delta records relative to the specified seq # or timestamp is retrieved and communicated depending on an access control list (ACL) of the changed/affected nodes in the DM tree. That is, delta records in the sequence or time range may be filtered such that if an entity (e.g., DM server or authority) issuing the retrieve command/request can read a particular node of the DM tree, then that same entity should be able to see a filtered view of the delta records that correspond to or are associated with all readable nodes by that entity. In yet another instance, the DM client communicates only the delta records in the specified time or sequence range that were created based on previously-issued commands from a particular (non-privileged) DM server issuing the retrieve command.

Based on communication 260, the DM client 202 sends at least one communication 270 to the DM server 204 for communicating the one or more requested delta records. In some instances, copies of the requested and retrieved delta records are sent. However in other instances the actual requested and retrieved delta records are sent such that a substantially simultaneous send-purge operation is performed. A single delta record or multiple delta records may be contained in communication 270. Alternatively multiple delta records may be communicated to DM server 204 by sending multiple communications 270 in serial or parallel wherein each communication 270 contains a single record.

After the DM client 202 communicates the requested delta records, the DM client 202 may purge (e.g. permanently delete) some or all of the stored/accumulated delta records (e.g., the same records that were sent to the DM server 204 may be purged). As shown in FIG. 2, the DM server 204 may in some instances send a communication or message 280 to the DM client 202 for purging one or more of the delta records. That is, communication 280 instructs or commands the DM client 202 to purge one or more delta records. Communication 280 may also be in the format of a Package 4 which is specified by the OMA DM protocol. In some instances communications 260 and 280 may be combined into a single communication which, when received by the DM client 202, causes the DM client to send copies of delta records to the DM server 204 and subsequently purge the original delta records for example once the DM server 204 acknowledges safe receipt of the copies. Responsive to communication 280, the DM client 202 performs operation 290 to process the communication 280 for performing one or more operations of identifying/determining delta records to be purged, as well as retrieving and purging delta records.

The purging of delta records may occur in one or more situations, for example: substantially immediately after the DM client communicates the delta records relative to the retrieve command; after receipt by the DM client of an acknowledgement from the DM server which indicates that the DM server has received the requested delta records; and based on the DM client receiving a purge command from the DM server as shown in FIG. 2 by communication 280.

Although not shown in FIG. 2, the DM server may also submit an inquiry related to the status of a specific change entry or delta record based upon a unique identifier. This status inquiry may be similar to the communication 260 which instructs the DM client to retrieve and send one or more delta records. The DM server may also make a status inquiry for a time-based or sequence-based range of unique identifiers. Since multiple entities may be communicating with a common DM client to command/request changes, the unique identifier may include additional information such as an identifier of an entity that requested or commanded the change which resulted in creation and storage of the delta record. For example, the unique identifier may include the name of the DM server or DM Management Authority. In some instances the unique identifier may include a combination of a timestamp, sequence number and entity identifier/name. One example delta record is
<Delta> <timestamp> <sequence #> <authority ID> <record type> <MO URI> </Delta>
where:
element <timestamp> specifies a date and time of change. This element may specify a date and/or time using the format defined in, for example *Device Management Tree and Description* OMA-TS-DM_TND-V1_3-20100119-D TND section 7.7.6 Tstamp;
element <sequence> increments for each new Delta Record created, for example as a 16 bit unsigned integer;
element <authority ID> specifies the DM server ID which enacted the change to the DM Tree MO.

Based on receipt of communication 270 from the DM client 202, the DM server 204 may collect and use the delta records for various reasons including backup and restoration operations. In some instances the DM server may also store a copy of the original DM tree. If the DM tree is lost from the UE, the DM server may use the combination of the original DM tree and the entries from the change log to restore the DM tree. The stored entries from the change log may also be used to restore a UE to a previous configuration by rolling back the changes stored in the change log. Rolling back the DM tree on the UE may also be accomplished by storing reverse change log entries. For example, if a delete command is executed by the DM client, a corresponding reverse change log entry would be stored. In this example the reverse change log entry corresponding to the delete command would be an add command. If the UE needed to roll back to a previous version, the entries in the reverse change log would be applied to the DM tree. Applying the reverse change log entries would return the UE DM tree to a previous state.

In some embodiments the DM client on the UE may be configured to push the delta records to the DM server in an unsolicited manner and relative to a triggering event or criteria as shown in FIG. 3. That is, the DM server may receive one or more delta records from the DM client without the DM server explicitly requesting them (e.g. via communication 260 of FIG. 2). Turning now to FIG. 3 the delta record push embodiment is described.

By comparing FIG. 3 to previously-described FIG. 2 it can be appreciated that some similarities exist. In particular, operations 310-350 may be substantially similar to respective operations 210-250 of FIG. 2. Regardless, operations 310-350 are now described briefly. As shown in FIG. 3, DM client 302 may be different from, the same as or substantially similar to DM client 125 of FIG. 1 and DM client 202 of FIG. 2. Also, DM server 304 may be the same as or substantially similar to one or both of DM servers 105, 140 shown in FIG. 1 and DM server 204 of FIG. 2. Communication 310, which is sent by DM server 304 to DM client 302, may include information or a command that tells the DM client to start or otherwise enable delta record functionality. After enabling delta record functionality, the DM server 304 may send communication 320 to the DM client 302 for modifying an element (i.e. an MO) of the DM tree. Communication 320 may specify that an element of the DM tree be created, modified or deleted.

Responsive to communication 320, the DM client 302 processes the communication in operation 330 to modify the DM tree or an MO thereof accordingly and generate a delta record indicating the change that was made. Operation 330 performed by the DM client 302 may include one or more operations of: modifying the DM tree according to a received communication (e.g. communication 320); creating a delta record that indicates a change made to the DM tree; and storing the delta record in the UE. As is indicated by communication 340 and operation 350, additional delta records may be created and/or stored by the DM client 302 after operation 330. That is, the DM server 304 may send communication 340 (which may be similar to communication 320) to the DM client 302 for modifying an element (i.e. an MO) of the DM tree. Responsive to communication 340, the DM client 302 processes the communication in operation 350 (which may be similar to operation 330) to modify the DM tree accordingly and generate a delta record indicating the change that was made to the DM tree.

After the DM client 302 has generated and accumulated or otherwise stored a number of delta records the DM client 302 may detect a triggering condition or criteria as is shown by operation 360. Once this triggering condition or criteria has occurred, been detected, etc. the DM client 302 may proceed to perform at least one of pushing and purging delta records. The triggering event or criteria may be configurable by, for example, a DM server or DM authority that is to receive the delta records. DM servers or DM authorities may configure the DM client with one or more triggering events or criteria so that the DM servers or authorities receive the push of delta records at different time or time intervals, or relative to different thresholds. In one case, the triggering event or criteria may be time-based, for example according to elapsing of a time span or duration, or occurrence of a specific time and/or day after which accumulated delta records are pushed and purged.

In another case, the triggering event may be identified by the DM client which may be configured to monitor, check, detect or otherwise determine the accumulation of the delta records that the DM client is creating and storing. Since a finite amount of storage space may be allocated in a memory of the UE for use by the DM client, the DM client may monitor the storage space or quantity of delta records held therein so that, for example delta records do not become overwritten and lost. Accordingly, the pushing of delta records can be useful if the DM client-managed storage in the UE becomes low. For example, the DM client may be configured with a threshold value that it uses to prevent loss of delta records. In one instance the threshold corresponds to or is reconciled with a (maximum) number of delta records that may be stored. In another instance the threshold corresponds to or is reconciled with a (minimum) remaining storage space for storing one or more delta records. Regardless, the DM client checks whether the accumulation of delta records is causing the threshold to be approached, met or exceeded. When the DM client identifies a situation vis-à-vis the creation and storage of delta records when the threshold is met or about to be met or exceeded, the DM client may push some or all of the accumulated delta records to one or more DM servers. As shown in FIG. 3, the push of delta records from the DM client 302 to the DM server 304 is indicated by communication 370. The push communication 370 from the DM client to the DM server may be formatted in a message or container as follows:

<Push Delta>
    <Delta> xxx </Delta> . . . <Delta> xxx </Delta>
    </Push Delta>

Although not shown in FIG. 3, it can be appreciated that the pushing of the delta records by the DM client to the DM server may be caused by a triggering event that is not initiated by the DM client itself (i.e., unsolicited). In one example, pushing delta records may be initiated in response to a request/command (e.g. purge communication 280 of FIG. 2 which may be optional) that the DM client receives from the DM server. The purge command/request 280 would be used to remove accumulated delta records, either all or a subset, from a recipient of the purge command/request. An example purge request/command may be formatted as follows:

<Purge> <all> </Purge> where a default is to purge records at the DM client that are only associated with the DM server issuing this command. However, a "privileged" DM server can cause the DM client to purge all records including those delta records associated with other DM servers. A DM client, however, may purge all its records.

Another example purge request/command may be formatted as follows:

<Purge> <seq #> </Purge> where this command/request causes removal of delta records with sequence number less than Seq # specified/identified in the request/command.

Yet another example purge request/command may be formatted as follows:

<Purge> <timestamp> </Purge> where this command/request causes removal of delta records with timestamp less than timestamp specified/identified in the request/command.

As further shown in FIG. 3, the DM client 302 performs operation 380 for purging one or more of the accumulated delta records. Purging operation 380 may be performed by the DM client 302 after the push communication 370, for example after the DM server 304 has acknowledged receipt of the pushed delta records. However, the purging operation 380 is not necessarily performed relative to the push communication 370. Indeed, the purging operation 380 may alternatively be performed relative to occurrence or detection of the triggering condition/criteria. That is to say, in some instances delta records may be purged, for example in order to free up needed storage space for additional delta records, without pushing the records.

FIG. 4 is a diagram illustrating an example processing device or apparatus 415 that includes a processor 410 suitable for implementing one or more embodiments disclosed herein. The illustrated apparatus 415 may be configured as a UE that implements a DM client. However, the illustrated apparatus 415 may additionally or alternatively be configured as a server device that implements a DM server. In addition to the processor 410 (which may be referred to as a central processor unit or CPU), the apparatus 415 includes a network interface or connectivity device 420 such as a transceiver, random access memory (RAM) 430, read only memory (ROM) 440, secondary storage 450, Global Positioning Satellite (GPS) sensor 480, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 490. Although the DSP 490 is shown as a separate component, the DSP 490 might be integral with the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, or optical disk). That is, example methods described herein may be performed when a machine such as a computing device executes instructions stored on a tangible or non-transitory medium such as RAM 430, ROM 440, or secondary storage 450. While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips.

The network interface or connectivity device 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more wireless transceiver components 425 such as an antenna capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 may be used to store programs that are loaded into RAM 430 when such programs are selected for execution.

The I/O devices 460 may include various user interface devices or apparatuses known in the art such as liquid crystal displays (LCDs), touch screen displays, keyboards, keypads, switches, dials, mice, track balls, voice recognizers, card readers, paper tape readers, printers, video monitors, or other well-known input devices. Also, the transceiver 425 might be considered to be a component of the I/O devices 460 instead of or in addition to being a component of the network connectivity devices 420.

The GPS sensor 480 decodes global positioning system signals, thereby enabling the apparatus 415 to determine its location. The apparatus 415 may receive the GPS signals via the wireless transceiver 425 which may be additionally or alternatively in communication with the GPS sensor 480. Location may be determined using Enhanced Observed Time Difference (EOTD), a position-location method wherein the UE triangulates its position using signals received by the transceiver 425. Other common methods of triangulation include Uplink Time Difference of Arrival (U-TDOA), Angle of Arrival (AOA), Location Pattern Matching (LPM) and Advanced Forward Link Trilateration (AFLT).

While several embodiments have been provided in the present disclosure, it should be understood that the disclosed systems and methods may be embodied in many other forms. The present examples are to be considered as illustrative and not restrictive, and the intention is not to be limited to the details given herein. For example, the various elements or components may be combined or integrated in another system or certain features may be omitted, or not implemented. Other examples of changes, substitutions, and alterations are ascertainable by one skilled in the art.

What is claimed is:

1. A method performed by a mobile device, comprising:
 receiving a command from a first device management (DM) server to perform an operation on a node of an Open Mobile Alliance (OMA) DM tree, the operation being one of creating, modifying, and deleting;
 performing the operation on the node;
 creating a first delta record based on the command received from the first DM server, the first delta record indicating the operation performed on the node and a Uniform Resource Identifier (URI) of the node, the first delta record further including a sequence number, time stamp, and authority identifier identifying the first DM server;
 accumulating the first delta record with a plurality of delta records on the mobile device in a data structure that is separate from the OMA DM tree to form a plurality of accumulated delta records;
 pushing delta records, which were accumulated in the data structure separate from the OMA DM tree, to a second DM server when a threshold relating to a maximum quantity of delta records for the delta records is met or exceeded, the pushing providing to the second DM server, according to an access control list, only certain delta records that the second DM server is authorized to receive; and
 rolling back an event sequence, wherein the rolling-back is based on time stamps and sequence numbers associated with the plurality of accumulated delta records.

2. The method of claim 1 wherein the threshold relates to a storage space used for the delta records.

3. The method of claim 1 further comprising, after the pushing, purging delta records that were pushed.

4. The method of claim 1 wherein the second DM server is the first DM server.

5. The method of claim 1 wherein the second DM server is different from the first DM server.

6. The method of claim 1, further comprising, prior to creating the first delta record, receiving from the DM server a command to create the first delta record.

7. A mobile device comprising:
 a processor;
 storage;
 a communications subsystem;
 wherein the processor, storage and communications subsystem cooperate to perform the operations of:
 receive a command from a first device management (DM) server to perform an operation on a node of an Open Mobile Alliance (OMA) DM tree, the operation being one of creating, modifying, and deleting;
 perform the operation on the node;
 create a first delta record based on the command received from the first DM server, the first delta record indicating the operation performed on the node and a Uniform Resource Identifier (URI) of the node, the first delta record further including a sequence number, time stamp, and authority identifier identifying the first DM server;
 accumulate the first delta record with a plurality of delta records in a data structure, the data structure being separate from the OMA DM tree to form a plurality of accumulated delta records;
 push delta records which were accumulated in the data structure separate from the OMA DM tree, to a second DM server when a threshold relating to a maximum quantity of delta records for the delta records is met or exceeded, wherein the communication interface is configured to push to the second DM server only certain delta records that the second DM server is authorized to receive according to an access control list; and
 roll back an event sequence, wherein the rolling-back is based on time stamps and sequence numbers associated with the plurality of accumulated delta records.

8. The mobile device of claim 7 wherein the threshold relates to a storage space used for the delta records.

9. The mobile device of claim 7 wherein the DM client is operable, after the delta records are pushed, to purge said delta records.

10. The mobile device of claim 7 wherein the second DM server is the first DM server.

11. The mobile device of claim 7 wherein the second DM server is different from the first DM server.

12. The mobile device of claim 7, wherein the processor, storage and communications subsystem further cooperate to perform the operations of, prior to creating the first delta record, receiving from the DM server a command to create the first delta record.

13. A non-transitory computer readable medium storing instructions which, when executed, cause a mobile device to perform the operations of:
   receiving a command from a first device management (DM) server to perform an operation on a node of an Open Mobile Alliance (OMA) DM tree, the operation being one of creating, modifying, and deleting;
   performing the operation on the node;
   creating a first delta record based on the command received from the first DM server, the first delta record indicating the operation performed on the node and a Uniform Resource Identifier (URI) of the node, the first delta record further including a sequence number, time stamp, and authority identifier identifying the first DM server;
   accumulating the first delta record with a plurality of delta records on the mobile device in a data structure that is separate from the OMA DM tree to form a plurality of accumulated delta records; and
   pushing delta records, which were accumulated in the data structure separate from the OMA DM tree, to a second DM server when a threshold relating to a maximum quantity of delta records for the delta records is met or exceeded, the pushing providing to the second DM server, according to an access control list, only certain delta records that the second DM server is authorized to receive; and
   rolling back an event sequence, wherein the rolling-back is based on time stamps and sequence numbers associated with the plurality of accumulated delta records.

14. The non-transitory computer readable medium of claim 13 wherein the threshold relates to a storage space used for the delta records.

15. The non-transitory computer readable medium of claim 13 further comprising, after the pushing, purging delta records that were pushed.

16. The non-transitory computer readable medium of claim 13 wherein the second DM server is the first DM server.

17. The non-transitory computer readable medium of claim 13 wherein the second DM server is different from the first DM server.

18. The non-transitory computer readable medium of claim 13 wherein the instructions, when executed, further cause the mobile device to perform the operations of prior to creating the first delta record, receiving from the DM server a command to create the first delta record.

* * * * *

UNITED STATES PATENT AND TRADEMARK OFFICE
CERTIFICATE OF CORRECTION

PATENT NO. : 9,467,338 B2  
APPLICATION NO. : 13/053901  
DATED : October 11, 2016  
INVENTOR(S) : Nicholas Patrick Alfano and Thomas Owen Parry Page 1 of 1

It is certified that error appears in the above-identified patent and that said Letters Patent is hereby corrected as shown below:

On the Title Page

Item (75), Column 1: under "Inventors"; Line 3, please delete "(GB)" and insert --(CA)--.

Signed and Sealed this  
Twenty-first Day of February, 2017

Michelle K. Lee  
*Director of the United States Patent and Trademark Office*